United States Patent
Heuberger et al.

(10) Patent No.: US 9,608,497 B2
(45) Date of Patent: Mar. 28, 2017

(54) WINDSCREEN WIPER MOTOR

(71) Applicant: Valeo Systèmes d'Essuyage, Le Mesnil Saint Denis (FR)

(72) Inventors: Christof Heuberger, Freiberg (DE); Harald Kapitza, Ludwigsberg (DE); Siegfried Stefani, Oberriexingen (DE); Werner Hartmann, Vaihingen/Enz (DE)

(73) Assignee: Valeo Systèms d'Essuyage, Le Mesnil Saint Denis (FR)

( * ) Notice: Subject to any disclaimer, the term of this patent is extended or adjusted under 35 U.S.C. 154(b) by 327 days.

(21) Appl. No.: 14/302,132

(22) Filed: Jun. 11, 2014

(65) Prior Publication Data

US 2014/0368072 A1 Dec. 18, 2014

(30) Foreign Application Priority Data

Jun. 14, 2013 (DE) .......................... 10 2013 106 221

(51) Int. Cl.
*H02K 7/06* (2006.01)
*H02K 7/116* (2006.01)
*B60S 1/08* (2006.01)
*B60S 1/16* (2006.01)

(52) U.S. Cl.
CPC .............. *H02K 7/1166* (2013.01); *B60S 1/08* (2013.01); *B60S 1/166* (2013.01); *H02K 2213/03* (2013.01); *H02K 2213/09* (2013.01)

(58) Field of Classification Search
CPC .......................... H02K 7/1166; H02K 2213/09
USPC .............................................. 310/83, 90, 75 R
See application file for complete search history.

(56) References Cited

U.S. PATENT DOCUMENTS

| | | | |
|---|---|---|---|
| 6,177,742 B1 * | 1/2001 | Lauk ........................ | B60S 1/166 310/75 R |
| 6,545,380 B1 * | 4/2003 | Saussele .................. | B60S 1/16 15/250.31 |
| 2005/0140224 A1 * | 6/2005 | Weigold ................. | B60S 1/166 310/90 |
| 2012/0275733 A1 * | 11/2012 | Kastinger ............... | B60S 1/166 384/296 |

FOREIGN PATENT DOCUMENTS

DE 103 43 168 A1 4/2005

\* cited by examiner

*Primary Examiner* — Hanh Nguyen
(74) *Attorney, Agent, or Firm* — Osha Liang LLP

(57) ABSTRACT

The invention relates to a windscreen wiper motor (10), having a housing (12) for accommodating a gearing arrangement which comprises a gear wheel (20) rotatably mounted in a shaft (13), which gear wheel has, on its outer circumference, a toothing (21) which interacts with a counterpart toothing (19) on a drive shaft (15), wherein the shaft (13) is received in a mount (22; 22*a* to 22*c*), which is constructed as a bore, of the housing (12) in an eccentric bush (25; 25*a* to 25*c*) for setting the distance (a) between the shaft (13) and the drive shaft (15), and wherein a press fit is formed at least in regions between the mount (22; 22*a* to 22*c*) and the eccentric bush (25; 25*a* to 25*c*).

11 Claims, 4 Drawing Sheets

Figure 2:
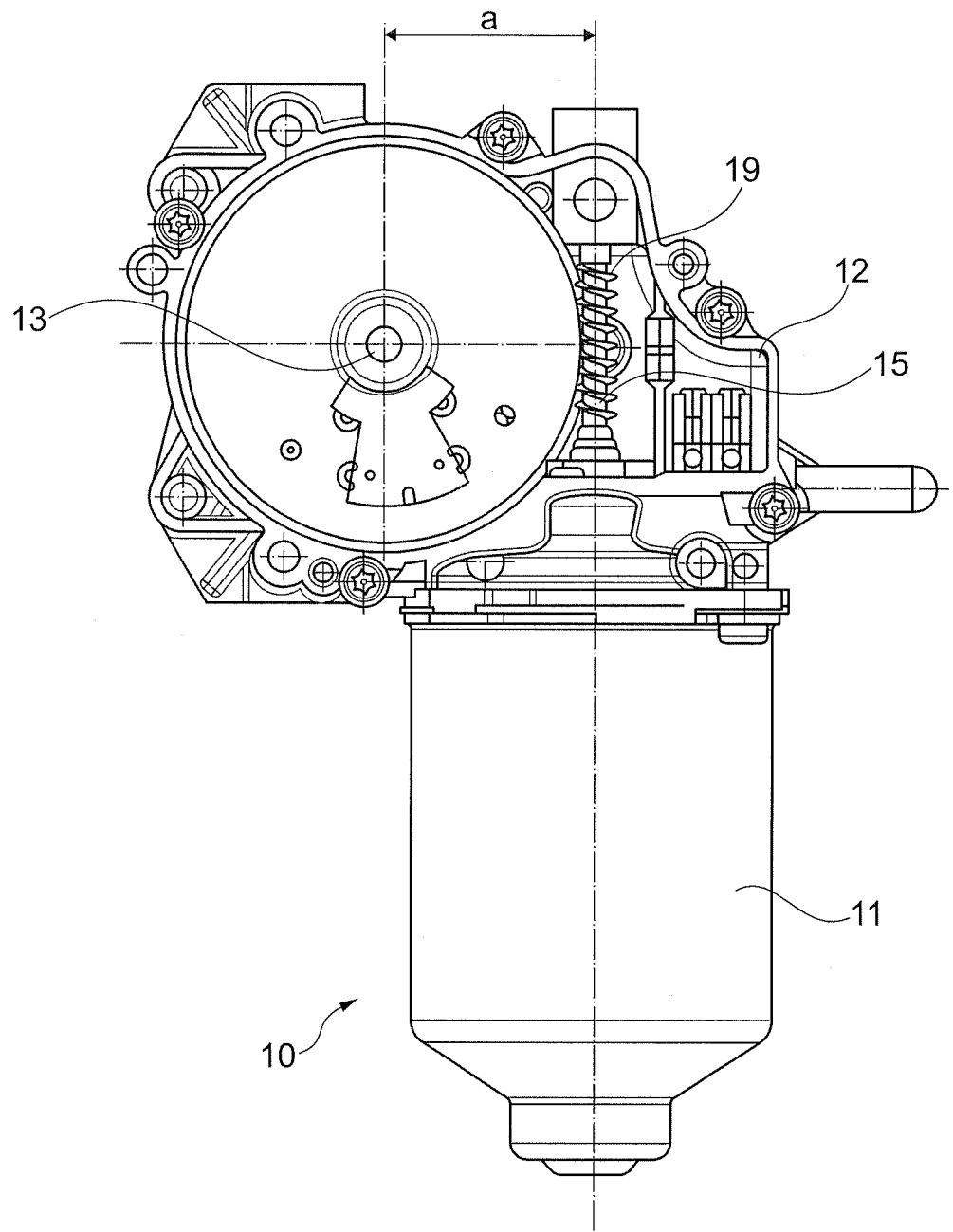

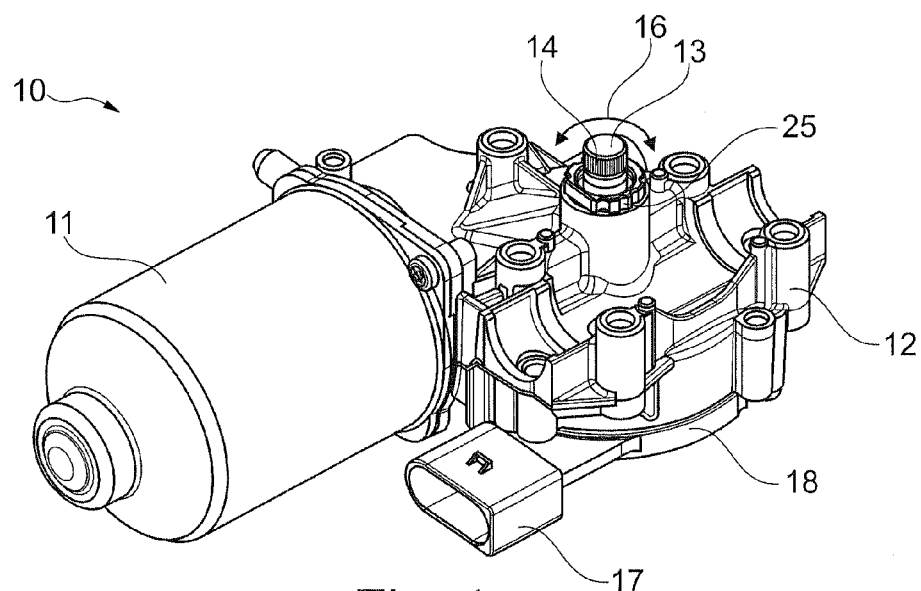
Fig. 1
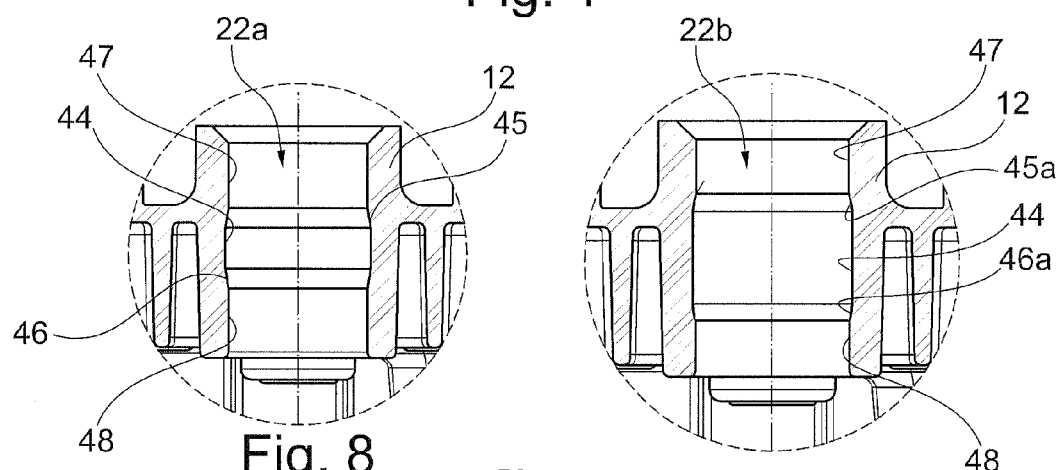
Fig. 8
Fig. 9
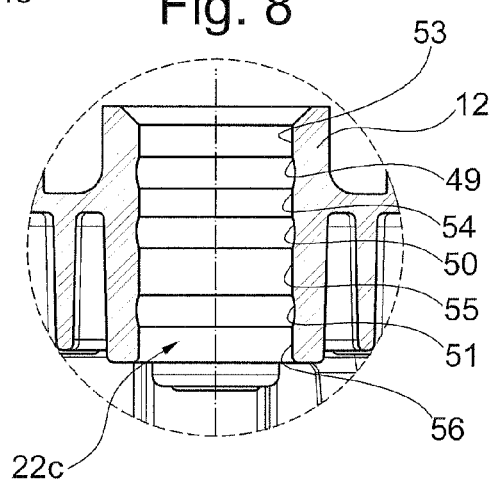
Fig. 10

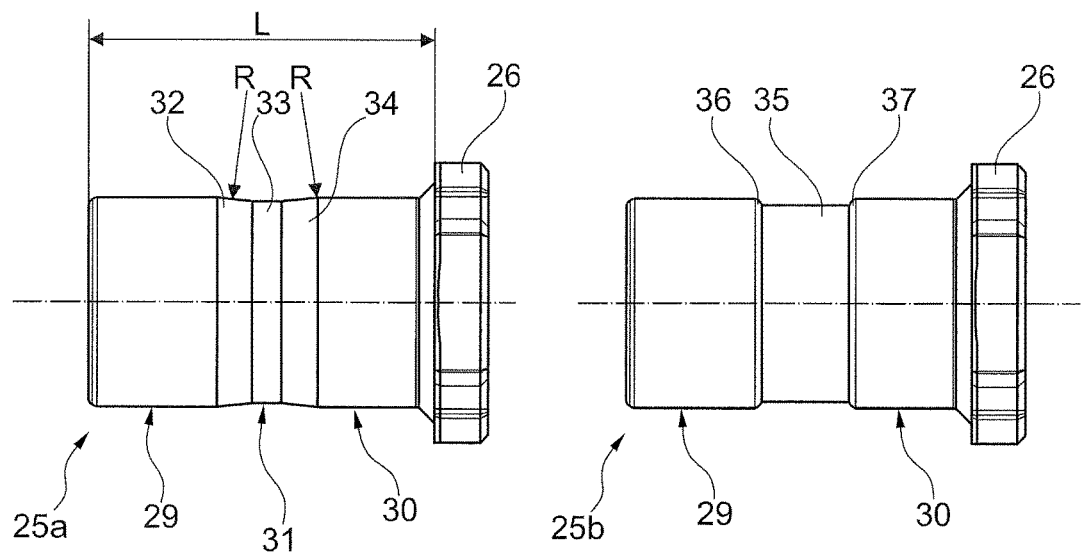
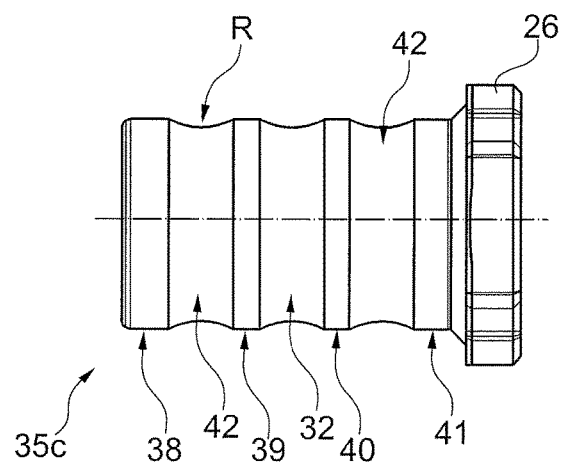

WINDSCREEN WIPER MOTOR

PRIOR ART

The invention relates to a windscreen wiper motor as per the preamble of claim 1, such as is known from the applicant's DE 103 43 168 A1. The known windscreen wiper motor has a housing for accommodating a gearing, into which housing the armature spindle of an electric motor projects in a manner known per se. In the housing there is arranged a single-stage or multi-stage gearing which comprises a spur gear or gear wheel rotatably mounted in a shaft. The gear wheel has, on its outer circumference, a toothing which meshes with a counterpart toothing formed on the armature spindle of the electric motor. The shaft is received in an eccentric bush which in turn is arranged in a through-bore of the housing, with a press fit being formed. By means of the eccentric bush, it is possible for the axial distance between the toothing of the armature spindle and the shaft to be adjusted during and/or after the assembly of the gearing. In this way, the pitch point between the toothing on the gear wheel and the counterpart toothing on the armature spindle can be optimized in order to achieve the highest possible efficiency and low electricity consumption. Owing to the relatively high load on the gear wheel and on the shaft, the eccentric bush is accommodated in the mount over a relatively large length. This also gives rise to relatively high adjustment forces if it is sought to rotate the eccentric bush in its mount in the housing in order to adjust the axial distance between the shaft and the armature spindle. It would duly be possible, by means of corresponding tolerancing of the outer diameter of the eccentric bush and/or the bore diameter at the mount, to attempt to reduce the forces of the press fit in order that a lower torque is required for rotating the eccentric bush, but such tolerancing, or the implementation and monitoring thereof, involves relatively high outlay from cost and manufacturing aspects.

DISCLOSURE OF THE INVENTION

Taking the presented prior art as a starting point, the invention is based on the object of further developing a windscreen wiper motor as per the preamble of claim 1 such that, firstly, reliable and stable mounting of the shaft in the housing is made possible, and such that, secondly, the adjustment forces required for rotating the eccentric bush in the mount are reduced in relation to the prior art, with it being possible for the mount and the eccentric bush to be produced in an advantageous manner.

Said object is achieved according to the invention, in the case of a windscreen wiper motor having the features of claim 1, in that the mount and/or the eccentric bush has, in an axial overlap region between the mount and the eccentric bush, at least one section in which no press fit is formed between the mount and the eccentric bush at least over a part of a circumferential region, and that the at least one section is located, as viewed in the longitudinal direction of the pivot shaft, between two sections in which a press fit is formed.

Here, in the context of the invention, "no press fit" means that the diameter of the mount in the section that does not form a press fit corresponds at least to the diameter of the eccentric bush. The invention therefore provides, in the axial overlap region between the mount and the eccentric bush, at least one section in which no press fit, and instead a gap, is formed, such that said section is neutral with regard to, and has no influencing effect on, the magnitude of the adjustment force required for rotating the eccentric bush in the mount. The advantage is thus achieved in particular that, in the other sections, in which the press fit is formed between the mount and the eccentric bush, tolerancing, which can be adhered to in a particularly simple and reliable manner from a manufacturing aspect, of the diameter of the mount and of the eccentric bush can be implemented, such that the press fit can be formed with relatively little outlay in said regions.

Advantageous refinements of the windscreen wiper motor according to the invention are specified in the subclaims.

In one particularly preferred refinement, it is provided that the section in which no press fit, or a gap, is formed between the mount and the eccentric bush is constructed over the entire rotational angle region of the mount and/or of the eccentric bush. Such a design can be realized particularly easily in particular from a manufacturing aspect by virtue of the section being produced by turning, grinding, pressing or the like.

To ensure that no media, in particular no moisture, pass(es) into the region between the mount and the eccentric bush, such that said region is in particular protected against corrosion, it is furthermore provided that the press fit is formed at least in an entry region in which the eccentric bush enters the mount of the housing.

In order, in particular, to permit a particularly stable mounting of the shaft in the mount or eccentric bush, which allows relatively high tilting moments to be introduced without the shaft tending to tilt in the mount, it is provided that the press fit is additionally formed in the exit region in which the eccentric bush exits the mount within the housing.

It is provided in particular that the at least one section in which no press fit is formed has a smaller diameter than sections which form a press fit.

A further optimization with regard to the adjustment of the required torques of the eccentric bush can be achieved if several sections which do not form a press fit are provided axially spaced apart from one another, between which there are formed sections which form press fits.

To reduce any notch effects, it is furthermore proposed that the at least one section in which no press fit is formed is provided with a rounding, a chamfer or a radius in a transition region to the section which forms a press fit.

In the case of the variant described immediately above, an optimization of the tilting moments that can be introduced via the shaft can be achieved if the axial length of a section forming a press fit and arranged between the entry and exit region is smaller than the axial length of a section forming a press fit and arranged in the entry and/or exit region.

It may also be provided that the section which does not form a press fit is provided, over its entire length, with a rounding. This permits particularly simple production of said section.

Figure 3:
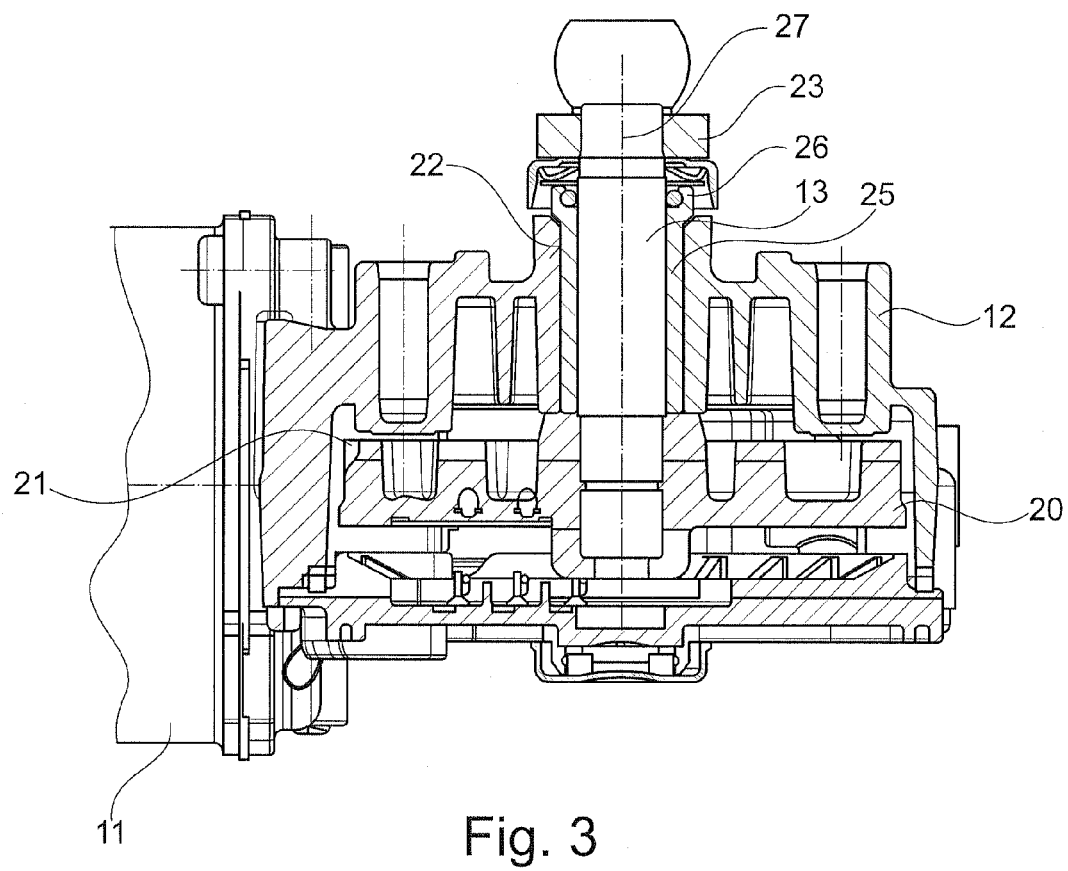
Figure 4:
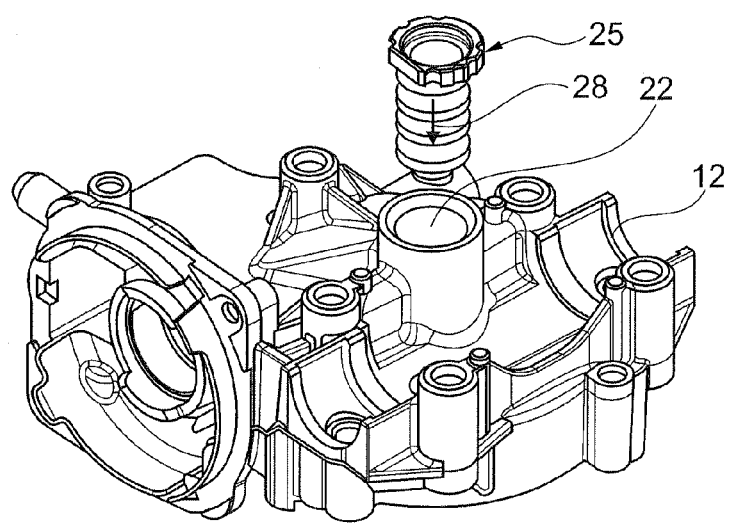

Further advantages, features and details of the invention will emerge from the following description of preferred exemplary embodiments and from the drawing, in which:

FIG. 1 shows a perspective view of a windscreen wiper motor according to the invention, FIG. 2 shows a plan view of the windscreen wiper motor as per FIG. 1, without its gearing cover, FIG. 3 shows a longitudinal section through the windscreen wiper motor of FIG. 1, FIG. 4 is a perspective illustration of a subregion of the windscreen wiper motor as per FIG. 3 for explanation of the process of the pressing of the eccentric bush into its mount in the housing, FIG. 5 to FIG. 7 each show, in a side view, different embodiments of eccentric bushes such as can be used in a windscreen wiper motor according to the invention, and FIG. 8 to FIG. 10 each show longitudinal sections in the region of mounts according to the invention for an eccentric bush in the housing of the windscreen wiper motor.

Identical elements or elements of identical function are denoted by the same reference signs in the figures.

FIGS. 1 and 2 illustrate a windscreen wiper motor 10 according to the invention, such as is used in particular for the actuation of a wiper linkage (not illustrated). The windscreen wiper motor 10 comprises a drive motor 11 which is in the form of an electric motor and which can be flange-mounted on a housing 12 of the windscreen wiper motor 10, which housing serves for accommodating a gearing which is not illustrated in detail. The gearing serves for reducing the rotational speed of the drive motor 11 while simultaneously increasing the torque thereof.

Out of the top side of the housing 12 there projects the upper end of a shaft 13, on the outer circumference of which there is formed a spline toothing 14. By way of the spline toothing 14, it is possible in particular for a lever 23, shown only in FIG. 3, to be mounted rotationally conjointly on the shaft 13 such that, as the shaft 13 rotates in the direction of the double arrow 16, the lever 23 is moved conjointly such that the wiper linkage can be actuated in the desired manner. Also visible in FIG. 1 is a plug connector 17 which is arranged on the housing 12 and which serves for the electrical contacting and activation of the drive motor 11. The plug connector 17 may for example be integrally moulded on a housing cover 18, wherein the housing cover 18 is composed of plastic. By contrast, the rest of the housing 12, in particular the region in which the shaft 13 is arranged, is preferably composed of aluminium, and is formed as an (aluminium) pressure die casting.

It can be seen in FIG. 3 that the shaft 13 projects into an interior space of the housing 12 and is connected rotationally conjointly there to a gear wheel 20, which is formed in particular as a plastics injection-moulded part. The gear wheel 20 has, on its outer circumference, a toothing 21 which meshes with a counterpart toothing 19 formed on that section of an armature spindle 15 of the drive motor 11 which projects into the housing 12 (FIG. 2), which armature spindle acts as a drive shaft. Said counterpart toothing 19 and armature spindle 15 are situated in a plane which is parallel to the plane of the drawing of FIG. 2, as can be seen in particular from the orientation of the drive motor 11.

A mount 22 for the leadthrough of the shaft 13 is formed as a through bore in the housing 12. In the mount 22 there is accommodated an eccentric bush 25 which serves for setting the axial distance a (FIG. 2) between the shaft 13 and the armature spindle 15. A press fit is formed at least in regions between the outer circumference of the eccentric bush 25 and the mount 22.

The eccentric bush 25 has, on the top side facing away from the housing 12, a radially encircling flange 26 which serves firstly for limiting the (axial) depth to which the eccentric bush 25 is pressed into the mount 22 and which secondly, by means of a corresponding geometry on its outer circumference, serves as a tool receptacle in order that, by means of a corresponding assembly or adjustment tool, and by overcoming the press fit, the eccentric bush 25 can be rotated in the longitudinal axis 27 of the mount 22. The eccentric bush 25 has a circular, eccentrically arranged internal bore for the rotatable mounting of the shaft 13, and is pressed into the housing 12 in the direction denoted in FIG. 4 by the arrow 28.

It can be seen from FIGS. 5 to 7 that the eccentric bush 25 has, on its outer circumference and as viewed in the direction of its longitudinal axis, sections 29 to 31, 35 and 38 to 42 of different diameters.

FIG. 5 illustrates the case in which the eccentric bush 25a has two in each case cylindrical sections 29, 30 which extend from one face side of the eccentric bush 25a and from the flange 26, respectively, in the direction of the centre of the eccentric bush 25a. The eccentric bush 25a is accommodated, over its entire length L with the exception of the flange 26, in the mount 22 of the housing 12. The length L of the eccentric bush 25a thus constitutes an axial overlap region between the eccentric bush 25a and the mount 22. The section 30 extending from the flange 26 is arranged in the entry region in which the mount 22 enters the housing 12. By contrast, the section 29 is arranged in the exit region in which the eccentric bush 25a exits the mount 22 in the housing 12 in the housing interior space.

In the two sections 29, 30, the diameter of the sections 29, 30 is coordinated with the (constant) diameter of the mount 22 such that a press fit is formed in each of the sections 29, 30. Between the two sections 29, 30 it is possible to see a section 31 which has a smaller diameter than the two sections 29, 30, wherein the section 31 has a smaller axial extent than the sections 29, 30. The section 31 is divided into three subsections 32 to 34, wherein the subsection 33 is in the form of a cylindrical section, and the two subsections 32 and 34 are each provided with a radius R. A gap is formed between the section 31 and the corresponding region of the mount 22, such that no press fit is formed between the section 31 and the mount 22.

FIG. 6 illustrates an eccentric bush 25b, the (central) section 35 of which extends at least approximately directly up to the sections 29 and 30. It is possible to see merely two chamfers 36, 37, which arise owing to the manufacturing process.

FIG. 7 illustrates an eccentric bush 25c which has a total of four sections 38 to 41 which are axially spaced apart from one another and in which in each case one press fit is formed between the eccentric bush 25c and the mount 22. Between the individual sections 38 to 41 there are formed three sections 42 in which no press fit but rather a gap is formed between the eccentric bush 25a and the mount 22, which sections 42 each have a radius R and, in the exemplary embodiment, are each approximately of the same axial extent or length. In this exemplary embodiment, too, the sections 39, 41 have a greater axial extent than the sections 39, 40.

The eccentric bushes 25a to 25c described thus far each interact with a cylindrical mount 22. It is however also conceivable, corresponding to FIGS. 8 to 10, for use to be made of an eccentric bush 25 with a cylindrical shell surface, that is to say with a constant outer diameter in the region of overlap with the mount 22, which eccentric bush interacts with a specially shaped mount 22 such that, correspondingly to the exemplary embodiments described above, it is likewise the case that a press fit is formed only in regions in the axial overlap region between the mount 22 and the eccentric bush 25. In this regard, reference is made firstly to the exemplary embodiment of FIG. 8 with a mount 22a. It can be seen that, in a central region of the mount 22a, there is formed a section 44 of enlarged internal diameter, which section is connected via conical subsections 45, 46 to the two sections 47, 48 arranged at the entry region and at the exit region of the mount 22a, in which sections 47, 48 the press fit is formed between the mount 22a and the eccentric bush 25 (not illustrated).

In the exemplary embodiment of FIG. 9, by contrast to the exemplary embodiment of FIG. 8, the sections 45a, 46a in the mount 22b are provided with a radius R.

Finally, FIG. 10 illustrates a mount 22c in which, analogously to the eccentric bush 25c, a total of three sections 49 to 51 with an enlarged internal diameter are provided, wherein the sections 49 to 51 each have approximately the same axial extent as viewed in the longitudinal direction of the mount 22c and are provided with a radius R. Between the sections 49 to 51 and at the two face sides there are situated in each case cylindrical sections 53 to 56 in which a press fit is formed between the mount 22c and the eccentric bush 25 (not illustrated). The sections 53, 56 have a greater axial extent than the sections 54, 55.

The windscreen wiper motor 10 described thus far can be altered and modified in a variety of ways without departing from the concept of the invention. Accordingly, it is for example conceivable for sections with different diameters to be provided both on a mount 22 and also on an eccentric bush 25, in each of which sections there is formed a press fit or a gap.

LIST OF REFERENCE SIGNS

10 Windscreen wiper motor
11 Drive motor
12 Housing
13 Shaft
14 Spline toothing
15 Armature spindle
16 Double arrow
17 Plug connector
18 Housing cover
19 Counterpart toothing
20 Gear wheel
21 Toothing
22, 22a Mount
22b, 22c Mount
23 Lever
25, 25a Eccentric bush
25b, 25c Eccentric bush
26 Flange
27 Longitudinal axis
28 Arrow
29 Section
30 Section
31 Section
32 Subsection
33 Subsection
34 Subsection
35 Section
36 Chamfer
37 Chamfer
38 Section
39 Section
40 Section
41 Section
42 Section
44 Section
45, 45a Subsection
46, 46a Subsection
47 Section
48 Section
49 Section
50 Section
51 Section
53 Section
54 Section
55 Section
56 Section
a Distance
R Radius
L Length

The invention claimed is:

1. A windscreen wiper motor, comprising:
a housing for accommodating a gearing arrangement which comprises a gear wheel rotatably mounted in a pivot shaft,
wherein the pivot shaft is mounted in a mount of the housing through an eccentric bush for setting a position of the pivot shaft,
wherein a press fit is formed at least in regions between the mount and the eccentric bush,
wherein the mount and/or the eccentric bush has, in an axial overlap region between the mount and the eccentric bush, at least one section in which no press fit is formed between the mount and the eccentric bush at least over a part of a circumferential region, and that the at least one section is located, as viewed in the longitudinal direction of the pivot shaft, between two sections in which a press fit is formed, and
wherein several sections which do not form a press fit are provided axially spaced apart from one another, between which there are formed sections which form press fits.

2. The windscreen wiper motor according to claim 1, wherein the at least one section is constructed over the entire circumferential region of the mount and/or of the eccentric bush.

3. The windscreen wiper motor according to claim 1, wherein the press fit is formed at least in an entry region in which the eccentric bush enters the mount of the housing.

4. The windscreen wiper motor according to claim 3, wherein the press fit is additionally formed in an exit region in which the eccentric bush exits the mount within the housing.

5. The windscreen wiper motor according to claim 1, wherein the axial length of a section forming a press fit and arranged between an entry and exit region is smaller than the axial length of a section forming a press it and arranged in the entry and/or exit region.

6. The windscreen wiper motor according to claim 1, wherein the at least one section in which no press fit is formed is provided with a rounding, a chamfer or a radius in a transition region to the section which forms a press fit.

7. The windscreen wiper motor according to claim 6, wherein the section in which no press fit is formed has a cylindrical subsection.

8. The windscreen wiper motor according to claim 1, wherein the section in which no press fit is formed is constructed over its entire axial length with a radius.

9. The windscreen wiper motor according to claim 1, wherein the gear wheel has on its outer circumference a toothing which interacts with a counterpart toothing on the drive shaft.

10. The windscreen wiper motor according to claim 1, wherein the eccentric bush has a flange which projects out of the mount for limiting a depth of the eccentric bush inside the mount.

11. A windscreen wiper motor, comprising:
a housing for accommodating a gearing arrangement which comprises a gear wheel rotatably mounted in a pivot shaft, wherein the pivot shaft is mounted in a mount of the housing through an eccentric bush for setting a position of the pivot shaft, wherein a press fit is formed at least in regions between the mount and the eccentric bush, wherein the mount and/or the eccentric bush has, in an axial overlap region between the mount and the eccentric bush, at least one section in which no press fit is formed between the mount and the eccentric bush at least over a part of a circumferential region, and that the at least one section is located, as viewed in the longitudinal direction of the pivot shaft, between two sections in which a press fit is formed, and wherein the at least one section in which no press fit is formed has a smaller diameter than sections which form a press fit.

\* \* \* \* \*